(12) United States Patent
Goujon et al.

(10) Patent No.: US 7,421,346 B2
(45) Date of Patent: Sep. 2, 2008

(54) PROCESSING SEISMIC DATA

(75) Inventors: Nicolas Goujon, Oslo (NO); Johan Olof Anders Robertsson, Olso (NO); Kambiz Iranpour, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 234 days.

(21) Appl. No.: 10/534,118

(22) PCT Filed: Nov. 13, 2003

(86) PCT No.: PCT/GB03/04935

§ 371 (c)(1),
(2), (4) Date: Oct. 11, 2005

(87) PCT Pub. No.: WO2004/046759

PCT Pub. Date: Jun. 3, 2004

(65) Prior Publication Data

US 2006/0142946 A1    Jun. 29, 2006

(30) Foreign Application Priority Data

Nov. 15, 2002  (GB) ................. 0226675.7

(51) Int. Cl.
*G01V 1/28*      (2006.01)
(52) U.S. Cl. ........................................ 702/14
(58) Field of Classification Search ........... 702/17, 702/14
See application file for complete search history.

(56) References Cited

U.S. PATENT DOCUMENTS

| | | | |
|---|---|---|---|
| 4,091,356 A | | 5/1978 | Hutchins |
| 4,222,266 A | | 9/1980 | Theodoulou |
| 4,253,164 A | | 2/1981 | Hall, Jr. |
| 4,345,473 A | * | 8/1982 | Berni ................. 73/514.09 |
| 4,437,175 A | * | 3/1984 | Berni ..................... 367/24 |
| 4,520,467 A | * | 5/1985 | Berni ..................... 367/24 |
| 5,365,492 A | | 11/1994 | Dragoset, Jr. |
| 5,408,441 A | | 4/1995 | Barr et al. |
| 6,512,980 B1 | * | 1/2003 | Barr ......................... 702/1 |

FOREIGN PATENT DOCUMENTS

| | | |
|---|---|---|
| GB | 2 030 400 | 4/1980 |
| WO | WO 95/06263 | 3/1995 |
| WO | WO 00/55648 | 9/2000 |

OTHER PUBLICATIONS

International Search Report dated Mar. 17, 2004, for International Application No. PCT/GB03/04935.
UK Search Report dated May 1, 2003, for Application No. GB 0226675.7.

* cited by examiner

*Primary Examiner*—Donald E McElheny, Jr.
(74) *Attorney, Agent, or Firm*—Ari Pramudji; Liangang (Mark) Ye; Jeffrey E. Griffin

(57) ABSTRACT

A method of matching the impulse response of a hydrophone and the impulse of a geophone accelerometer comprises performing a calculus operation upon the response of one of the hydrophone and the accelerometer. A filter is then derived from the output of the calculus operation and the response of the other of the hydrophone and the accelerometer. The filter may then be used to match seismic data acquired by the one of the hydrophone and the accelerometer to seismic data acquired by the other of the hydrophone and the accelerometer. The calculus operation may comprise differentiating the hydrophone response, or integrating the accelerometer impulse response.

19 Claims, 11 Drawing Sheets

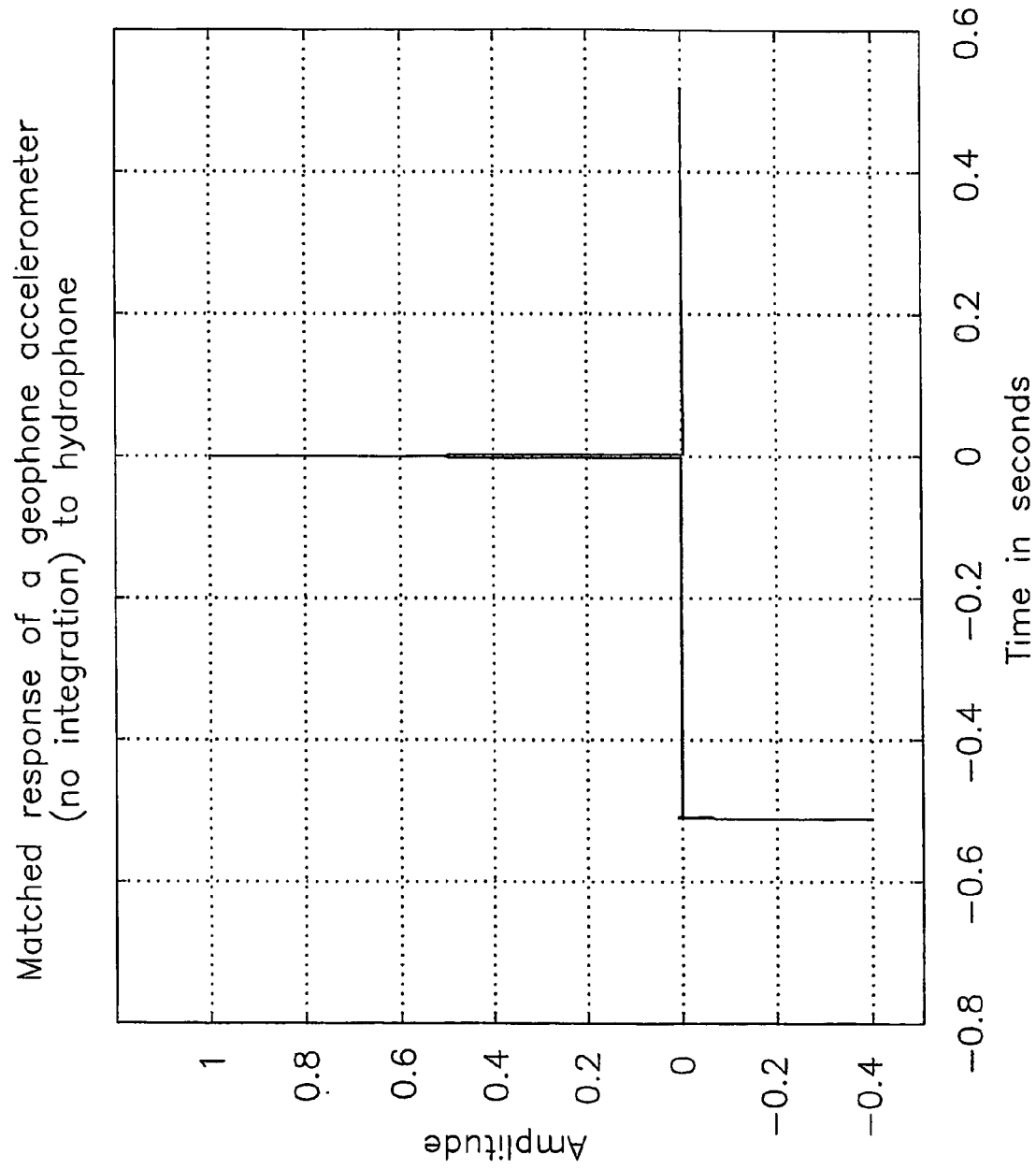
FIG_2(c)

PROCESSING SEISMIC DATA

CROSS-REFERENCE TO RELATED APPLICATIONS

This application is a U.S. national application of PCT/GB03/04935, filed Nov. 13, 2003, which claims priority to a GB Application No. 0226675.7, filed Nov. 15, 2002. Each of the aforementioned related patent applications is herein incorporated by reference.

The present invention relates to processing seismic data and, in particular, to processing seismic data that includes two data sets, the data sets relating to two different seismic parameters but to the same survey location.

In a seismic survey, seismic energy is emitted from a source and is detected by a seismic receiver located at a distance from the source. Some of the seismic energy emitted by the source passes into the earth's interior and is reflected by geological structures within the earth. Information about the geological structure of the earth's interior can be derived from the reflected seismic energy incident on the receiver.

A seismic receiver contains at least one sensor that detects seismic energy. Various different types of seismic sensors are known. One common type of seismic sensor is a hydrophone, which measures the pressure. Other known types of sensors, such as geophones, do not measure pressure but instead measure a component of the particle motion (the term "particle motion" includes particle displacement, particle velocity, particle acceleration and, in principle, higher derivatives of particle velocity). For example, a geophone measures the component of the particle velocity along a particular direction (particle velocity is a vector quantity, unlike pressure which is a scalar quantity). A three-component geophone, or 3-C geophone, measures the components of particle velocity along three mutually perpendicular axes (which are normally taken to be the x-, y- and z-axes).

Four component seismic receivers are known. A four component receiver, or 4-C receiver, is able to measure the pressure and three components of the particle velocity. A current 4-C receiver typically contains a 3-C geophone and a pressure sensor such as a hydrophone.

It is sometimes desired to combine measurements of different seismic parameters. For example, this may be done during the process of "de-ghosting" marine seismic data. In a marine seismic survey in which the receiver is located within a water column, in addition to the desired paths of seismic energy that involve reflection at a structure within the earth, other seismic energy paths will occur as a result of seismic energy being reflected or scattered from the surface of the water column. These additional paths are known as "ghost reflections". Ghost reflections are an undesirable source of contamination of seismic data, since they obscure the interpretation of the desired up-going reflections from the earth's interior.

In one known method, down-going ghost reflections are removed from marine seismic data using the following filter:

$$\tilde{P} = \frac{1}{2}\left[P - \frac{\rho\omega}{k_z}V_z\right] \quad (1)$$

where $\tilde{P}$ denotes the deghosted (up-going) pressure, P is the measured pressure, $V_z$ is the measured z-component of the particle velocity (that is, the vertical component of the particle velocity), $k_z = \sqrt{k^2 - \kappa^2}$ is the vertical wavenumber, $\kappa^2 = k_x^2 + k_y^2$, and $k_x$ and $k_y$ are the horizontal wavenumbers.

Use of the filter of equation (1) requires pressure data and particle velocity data to be combined, in this example by subtraction. There exist other cases in which pressure data and particle velocity data are combined, for example by addition or subtraction. As an example, methods for decomposing an acquired wavefield, for example into up-going and down-going constituents, are known that involve combination of pressure data and particle velocity data.

When seismic data relating to two different seismic parameters are to be combined, for example by addition, subtraction etc, it is usually necessary to match the two sets of data to one another before they can be combined. This is because a seismic data acquired using one type of sensor (such as a geophone) may not be directly combinable with seismic data acquired using a different type of sensor (such as a hydrophone). For example, the amplitude response of a geophone, as a function of frequency of the received seismic energy, may be different from the amplitude response of a hydrophone.

The phase response of a geophone, as a function of frequency of the seismic energy, may also be different from the phase response of a hydrophone. As a result, it is necessary to carry out frequency-dependent phase matching and frequency-dependent amplitude matching before geophone data (which is commonly, but not necessarily velocity data) can be combined with hydrophone (pressure) data. This matching may be carried out using, for example, a filter that attempts to match the impulse response of the geophone with the impulse response of the hydrophone. A typical matching filter is shown in FIG. 1.

It is expected that accelerometer sensors will increasingly often be used to acquire particle motion data, instead of conventional geophones. Accelerometer measurements are closely proportional to particle acceleration, rather than particle velocity, over most of the frequency band of interest in seismic surveying. Since accelerometer and hydrophone data are different types of measurements, a hydrophone and an accelerometer will experience an impulse very differently. According to the equation of motion in an acoustic medium, a time derivative of particle velocity is proportional to the gradient (first-order spatial derivatives) of pressure. Hydrophone data therefore have a magnitude response that is more proportional to particle velocity rather than to particle acceleration.

In order to combine accelerometer data and hydrophone (pressure) data it is again necessary to use a filter to match the phase and/or amplitude responses of the accelerometer and the pressure sensor. The filter shown in FIG. 1 is intended to be used in matching accelerometer data with pressure (hydrophone) data. However, direct matching of accelerometer data and pressure data, by a matching filter that matches the impulse response of an accelerometer and the impulse response of a hydrophone, suffers from edge effects. These edge effects arise because the amplitude response and phase response of an accelerometer are very different to the amplitude response and phase response of a hydrophone.

This problem is illustrated shown in FIGS. 2(a) to 2(c), which illustrate the matching of an accelerometer impulse response to a hydrophone impulse response using the filter of FIG. 1. In the matching process the accelerometer impulse response is filtered using the filter of FIG. 1, and the intention is that the filtered accelerometer impulse response should be matched to the hydrophone impulse response.

FIG. 2(a) shows the amplitude response of a typical geophone accelerometer, and FIG. 2(b) shows the amplitude response of a typical hydrophone. The matched accelerometer response, obtained by applying the matching filter of FIG. 1 to the geophone response of FIG. 2(a), is shown in FIG. 2(c) and it will be seen that this is not identical to the hydrophone response of FIG. 2(b) FIG. 3 illustrates the difference between the hydrophone's impulse response of FIG. 2(b) and the filtered accelerometer response of FIG. 2(c). Edge effects resulting from using a direct matching filter may be seen at low and high sample numbers, and these indicate that the matching filter has not correctly matched the accelerometer impulse response to the hydrophone impulse response. Ideally, the filtered accelerometer impulse response should match the hydrophone impulse response.

WO 00/55648 discloses a hydrophone assembly having a hydrophone and an in-built differentiator. The differentiator modifies the frequency response of the hydrophone, so that the frequency response of the hydrophone assembly more closely matches the frequency response of an accelerometer.

A first aspect of the present invention provides a method of matching the response of a hydrophone and the response of an accelerometer, the method comprising the steps of: performing a calculus operation upon the response of at least one of the hydrophone and the accelerometer; and deriving a filter from the output of the calculus operation and the response of the other of the hydrophone and the accelerometer.

The present invention involves the two steps of, firstly, performing a calculus operation upon the response of one of the hydrophone and the accelerometer and, secondly, deriving a filter that matches this with the response of the other of the hydrophone and the accelerometer. The invention provides better matching of the frequency and phase response of a hydrophone to the frequency and phase response of an accelerometer than does WO 00/55648, which uses only the step of differentiating the hydrophone output.

In practice, the output of an accelerometer may not be exactly proportional to the particle acceleration over the entire frequency range used in a seismic survey and, similarly, the output of a hydrophone may not be exactly proportional to the particle velocity over the entire frequency range used in a seismic survey. WO 00/55648 is unable to allow for this, since the differentiator of WO 00/55648 is hard-wired into the hydrophone assembly and operates on data of all frequencies. The present invention is able to allow for this, in contrast, since it incorporates use of the filter of the invention and does not simply apply the calculus operation to the response of the one of the hydrophone and accelerometer.

Furthermore, the frequency response of one type of accelerometer may vary from the frequency response of another type of accelerometer. Indeed, two accelerometers of the same type may have frequency responses that vary from one another. The present invention is able to take account of such variations, through the filter. In contrast, WO 00/55648 cannot take account of such variations, since the differentiator is hard-wired into the hydrophone assembly so that the frequency response of the hydrophone assembly is fixed.

According to the invention a calculus operation is applied to one response before determination of the matching filter. In one preferred embodiment of the invention, for example, the accelerometer response is integrated before determination of the matching filter. The original accelerometer data is, as noted above, closely proportional to particle acceleration over most of the frequency band of interest in seismic surveying, so the integrated accelerometer response should be closely proportional to particle velocity—and so may be more accurately matched with a hydrophone response which is also proportional to particle velocity.

In an alternative preferred embodiment of the invention, the hydrophone response is differentiated before matching with the accelerometer response. The original hydrophone data is proportional to particle velocity, so the derivative of the hydrophone response should be proportional to particle acceleration. The derivative of the hydrophone response may therefore be accurately matched with the accelerometer response.

The present invention thus allows the responses of a hydrophone and a geophone, which are two inherently different types of seismic sensor, to be matched to one another. This allows a set of seismic data obtained by a hydrophone and a set of seismic data obtained a geophone to be combined with minimum introduction of edge effects.

A second aspect of the invention provides a method of processing seismic data comprising the steps of: obtaining a filter for matching the response of an accelerometer and the response of a hydrophone according to a method of the first aspect; obtaining first seismic data using the one of the hydrophone and the accelerometer and obtaining second seismic data using the other of the hydrophone and the accelerometer; and using the matching filter to match the first seismic data to the second seismic data. In principle, the filter may be obtained before or after the seismic data are obtained.

The matching process may comprise applying the calculus operation to the first seismic data and subsequently applying the matching filter to the first seismic data. Alternatively, the filter may be used to derive one or more other filters which are then used to match the first seismic data to the second seismic data. After matching, the first seismic data may be combined with the second seismic data.

A third aspect of the invention provides an apparatus for matching the response of a hydrophone and the response of an accelerometer, the apparatus comprising: means for performing a calculus operation upon the response of at least one of the hydrophone and the accelerometer; and means for deriving a filter from the output of the calculus operation and the response of the other of the hydrophone and the accelerometer.

A fourth aspect of the invention provides an apparatus for processing seismic data and comprising: means for receiving first seismic data acquired using one of a hydrophone and an accelerometer and second seismic data acquired using the other of the hydrophone and the accelerometer; and means for matching the first seismic data and the second seismic data using a matching filter obtained by a method of the first aspect of the invention.

Further aspects and preferred features of the invention are set out in the remaining claims.

Preferred embodiments of the present invention will now be described by way of illustrative example with reference to the accompanying figures, in which:

FIG. 2(c) shows the result of applying the matching filter of FIG. 1 to the accelerometer impulse response of FIG. 2(a);

Figure 1:
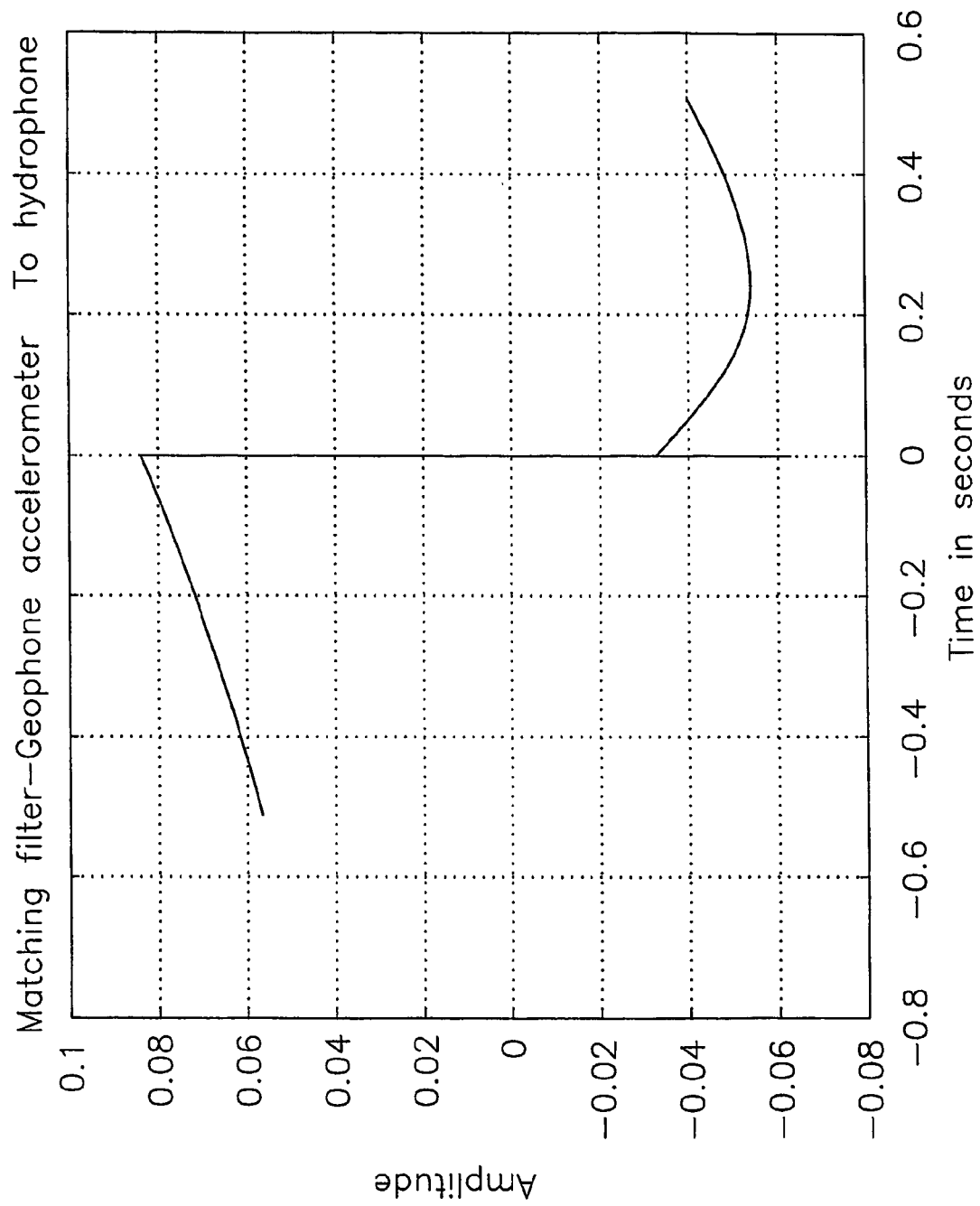
FIG. 1 shows a filter intended to match an accelerometer impulse response to a hydrophone impulse response.

According to the invention a matching filter is derived for use in matching a first set of seismic data acquired by one of a hydrophone and an accelerometer to a second set of seismic data acquired by the other of the hydrophone and the accelerometer. The matching filter is derived from the responses of the hydrophone and accelerometer. One method according to the invention for deriving the matching filter is shown in FIG. 7(a).

The input required to determine the matching filter is the impulse response of the hydrophone and the impulse response of the accelerometer. These may be derived from, for example, performance data supplied by the manufacturer. In general, a manufacturer will supply performance data with a hydrophone or accelerometer, and these data will include a theoretical impulse response. The data may include a general theoretical impulse response for the particular type of hydrophone or accelerometer. Alternatively, the data supplied by the manufacturer may give a theoretical impulse response for a device as a function of device parameters such as, for example, the resonant frequency. In this case the user may measure the relevant parameter(s) for a particular sensor and use these to determine the impulse response for the particular sensor.

In other cases, the manufacturer may determine the actual impulse response for each individual hydrophone or accelerometer, and supply these data to the user with the accelerometer/hydrophone. As a further alternative, the user may determine the impulse response for a particular hydrophone and/or accelerometer.

Thus, the input to the method of FIG. 7(a) is the impulse response of the hydrophone $Res_H$, at step A, and the impulse response of the accelerometer $Res_A$, at step C. Each impulse response may be an actual response or the best available estimate for the response.

According to the invention, a calculus operation is applied to the response of one of the hydrophone and the accelerometer. In the embodiment of FIG. 7(a), a differentiating operator is applied to the response of the hydrophone, at step B. The differentiation may be in the time domain or in the frequency domain. The output from step B is the derivative of the hydrophone response $Res_H$, and this will be denoted by diff($Res_H$).

At step D a matching filter is determined from the result of the calculus operation B and from the impulse response of the other device—namely the device whose impulse response was not involved in the calculus operation at step B, which, in this embodiment, is the accelerometer.

In a preferred embodiment, the matching filter $F_1$ is determined by dividing the differentiated impulse response of the hydrophone by the impulse response of the accelerometer. That is, the filter $F_1$ is determined according to:

$$F_1 = \text{diff}(Res_H)/Res_A \quad (2)$$

The matching filter $F_1$ may then be used to process seismic data in the acceleration domain, as will be described in more detail below.

FIG. 7(b) shows another embodiment of the method of the invention for obtaining a matching filter. In the embodiment, a calculus operation is again applied to the response of one of the hydrophone and the accelerometer, but in the embodiment of FIG. 7(b), an integration operator is applied to the response of the accelerometer, at step E. The integration may be performed in the time domain or in the frequency domain. The output from step E is the integral of the accelerometer response $Res_A$, and this will be denoted as Int ($Res_A$).

At step G a matching filter $F_2$ is determined from the result of the calculus operation D and from the impulse response of the other device—which, in this embodiment, is the hydrophone.

In a preferred embodiment, the matching filter $F_2$ is determined at step G by dividing the integrated impulse response of the accelerometer by the impulse response of the hydrophone. That is, the filter $F_2$ is determined according to:

$$F_2 = \text{Int}(Res_A)/Res_H \quad (3)$$

The matching filter $F_2$ may then be used to process seismic data in the velocity domain, as will be described in more detail below.

A matching filter of the invention may be used to match a set of seismic data obtained using an accelerometer to another set of seismic data obtained at the same survey location using a hydrophone. A calculus operation is applied to one of the sets of seismic data. More specifically, the same calculus operation as used to determine the matching filter is applied to seismic data acquired by the sensor to whose response the calculus operation was applied during the determination of a matching filter. The appropriate matching filter is then applied to match the amplitude and/or phase of that data set to the amplitude and/or phase of the other data set.

In one preferred embodiment of the matching process of the invention, the accelerometer data are integrated and the matching filter $F_2$ is applied to the integrated accelerometer data to match them to the hydrophone data. The original accelerometer data is, as noted above, closely proportional to particle acceleration over most of the frequency band of interest in seismic surveying, so that the integrated accelerometer data should be closely proportional to particle velocity—and so may be more accurately matched with the hydrophone data which is also proportional to particle velocity.

In another preferred embodiment of the matching process of the invention, the hydrophone data are differentiated and the matching filter $F_1$ is applied to the differentiated hydrophone data to match them to the accelerometer data.

Figure 2A:
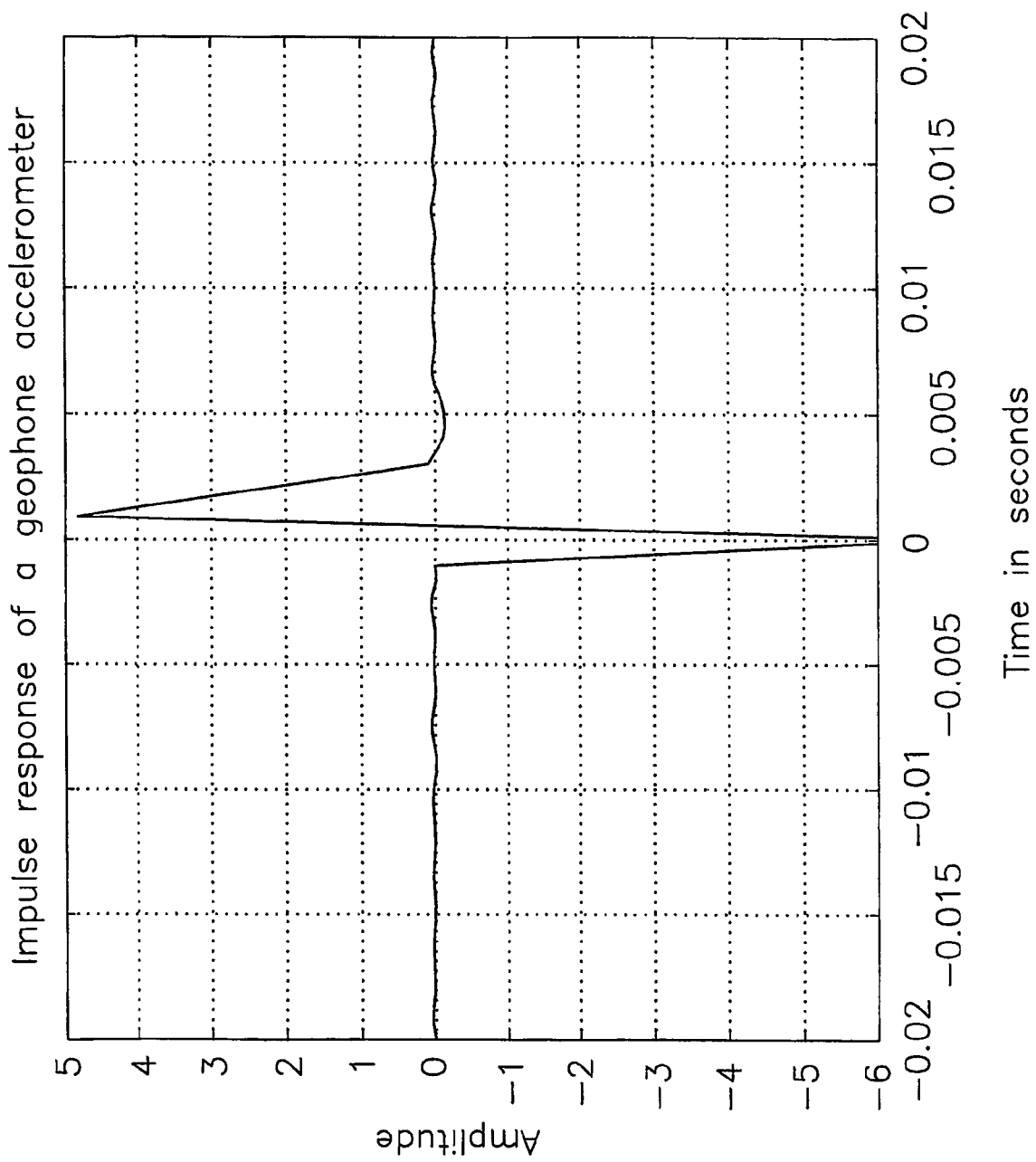
FIG. 2(a) shows a typical geophone accelerometer impulse response.
Figure 4:
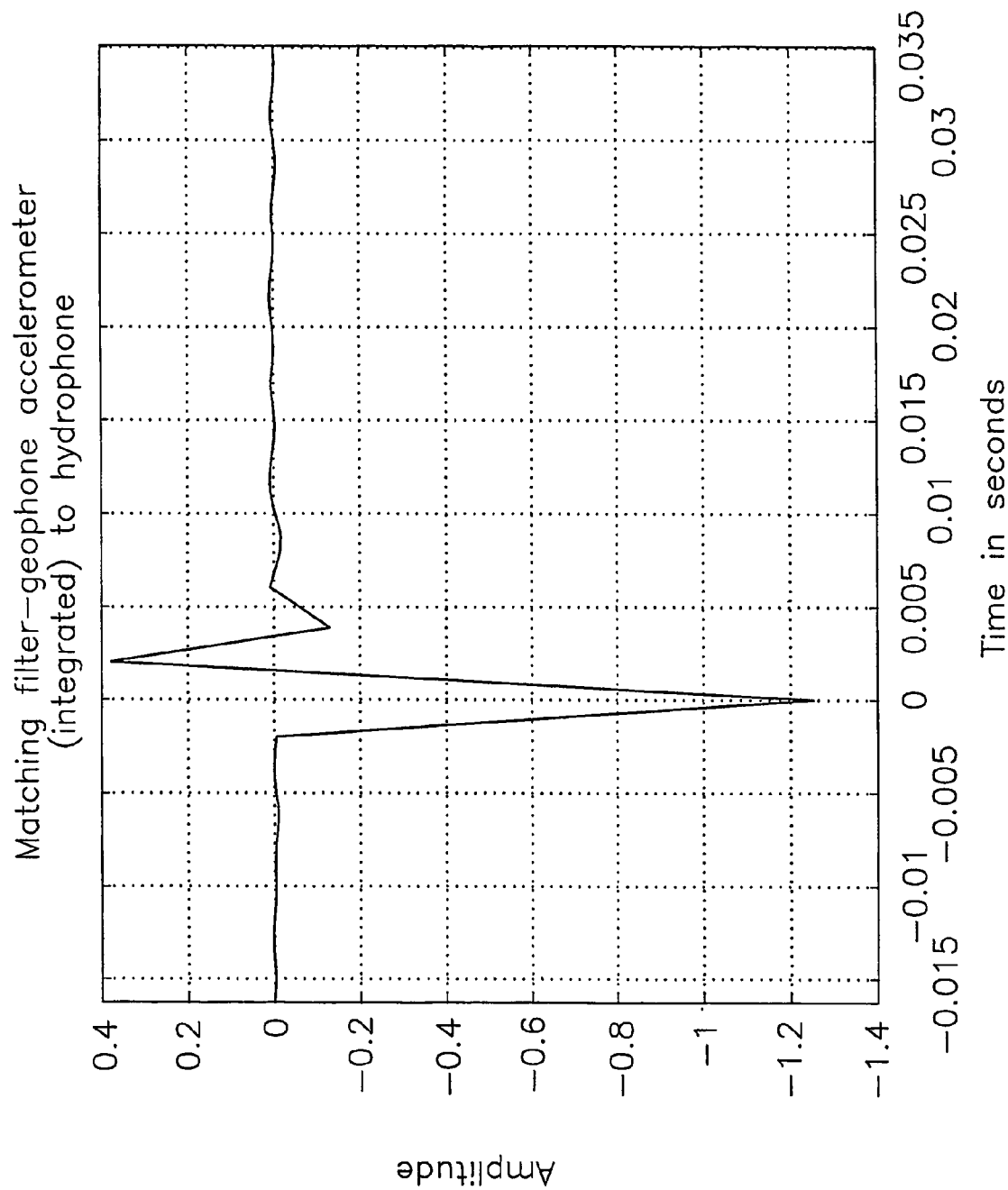
FIG. 4 shows a filter intended to match an integrated accelerometer impulse response to a hydrophone impulse response.
Figure 5:
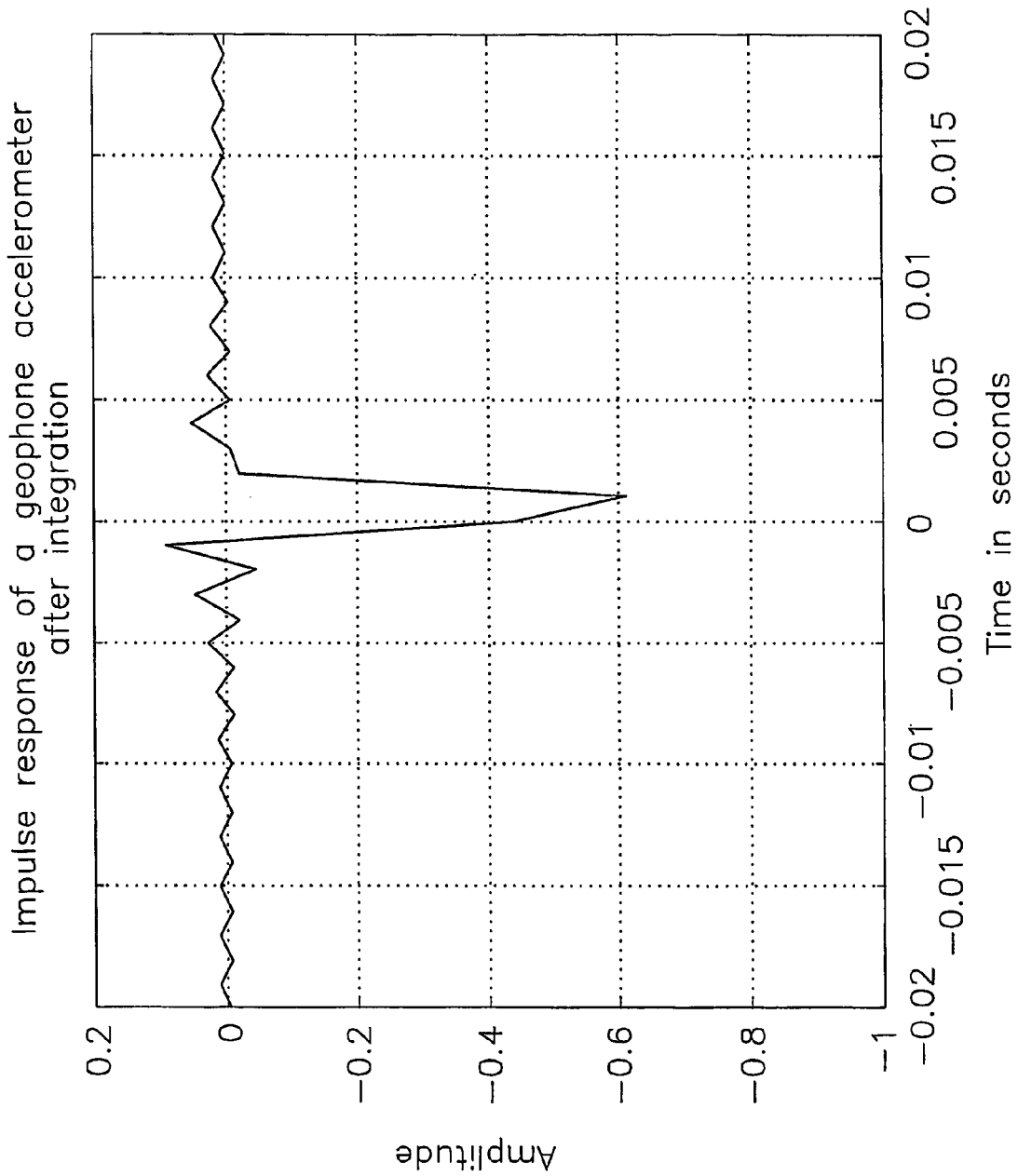
FIG. 5 shows an integrated accelerometer impulse response obtained by integrating the accelerometer impulse response of FIG. 2(a)
Figure 6:
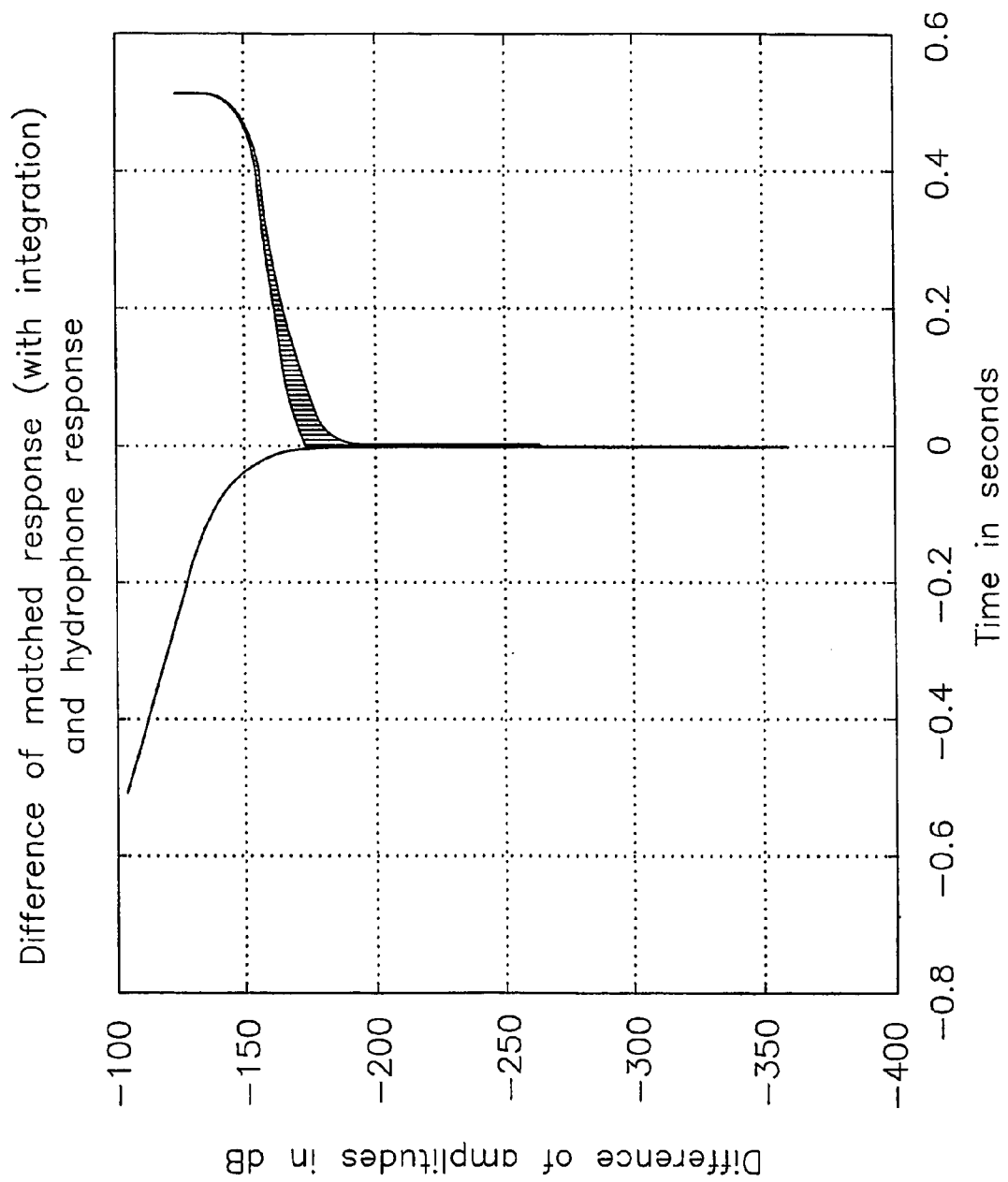
FIG. 6 shows the difference between the filtered accelerometer impulse response of FIG. 5 and the hydrophone impulse response of FIG. 2(b)

FIGS. 4 to 6 illustrate results obtained by the invention. FIG. 5 shows the results of integrating the geophone accelerometer response of FIG. 2(a) with respect to time. In this embodiment the integration was carried out using a Laplace technique but, in principle, the integration may be carried out using any suitable numerical integration technique. FIG. 5 thus represent the results of step E of the method of FIG. 7(b).

Figure 2B:
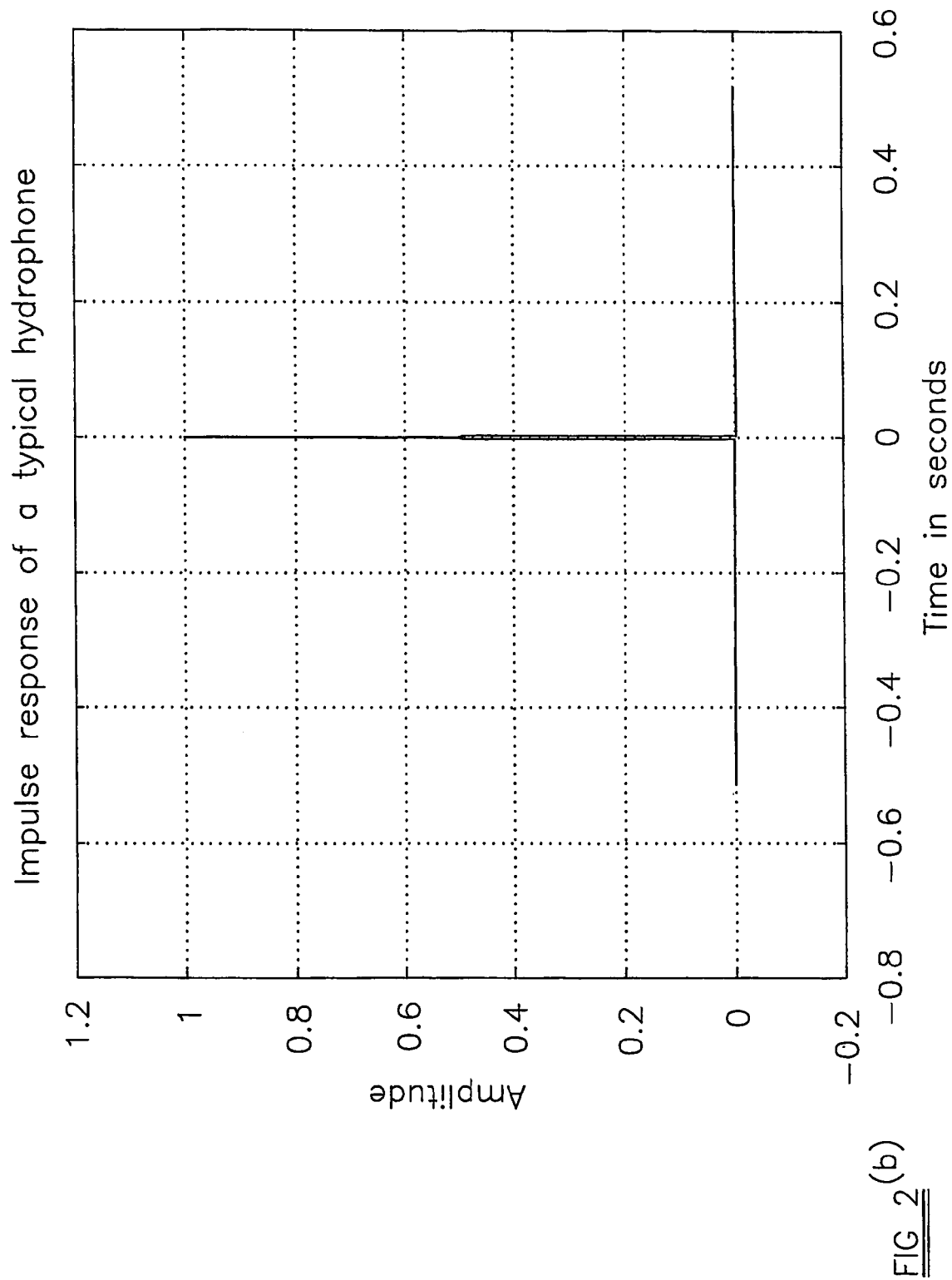
FIG. 2(b) shows a typical hydrophone impulse response.

FIG. 4 shows a matching filter for matching the integrated accelerometer response of FIG. 5 to the hydrophone response of FIG. 2(b). FIG. 4 represents the filter $F_2$ obtained by step G of the method of FIG. 7(b). In this case the filter was obtained by dividing the integrated accelerometer response of FIG. 5 by the hydrophone response of FIG. 2(b), but it may alternatively be obtained using any suitable numerical technique.

Figure 3:
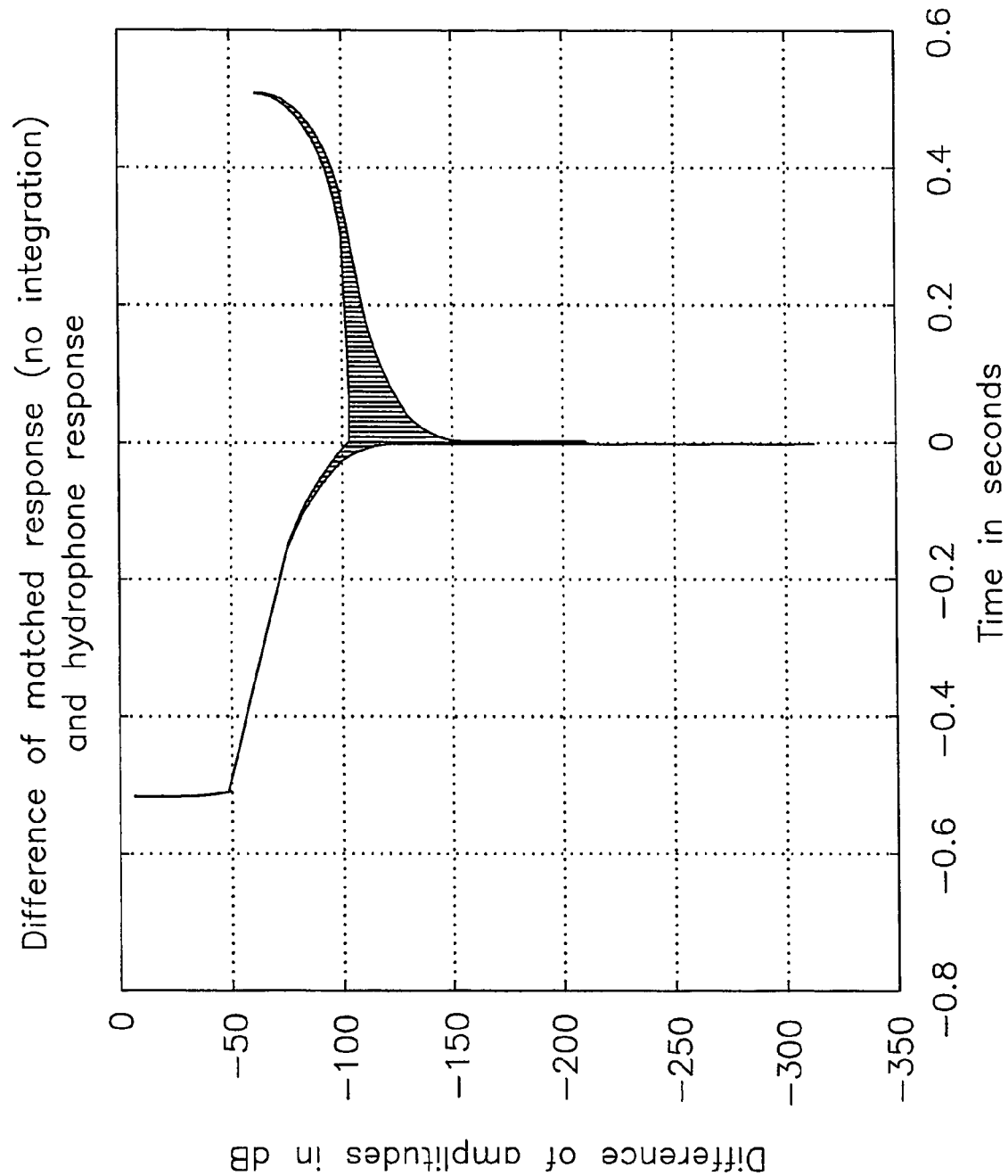
FIG. 3 shows the difference between the filtered accelerometer impulse response of FIG. 2(c) and the hydrophone impulse response of FIG. 2(b)

FIG. 6 illustrates the difference between the matched integrated accelerometer impulse response, obtained by filtering the integrated accelerometer response of FIG. 5 using the filter of FIG. 4, and the hydrophone impulse response of FIG. 2(*b*). It will be seen, by comparing FIGS. 3 and 6, that the present invention provides a much smaller difference between the two impulse responses that does the conventional matching process. In FIG. 6 the method of the present invention provides a difference between the impulse responses that, at the edges, reaches a maximum of approximately −100 dB. In contrast, as shown in FIG. 3, the conventional method produces a difference between the impulse responses that, at the edges, reaches a maximum of close to 0 dB. (It will be noted that the vertical scale of FIG. 6 covers smaller amplitude differences that does the vertical scale of FIG. 3.)

(In principle, the result of applying the matching filter of FIG. 4 to the integrated accelerometer response of FIG. 5 would be identical to the hydrophone response of FIG. 2(*b*), since the matching filter was derived from the integrated accelerometer response and the hydrophone response. Limitations such as rounding errors in the integration step and numerical errors in the determination of the filter mean however that, in practice, the integrated accelerometer response is not identical to the hydrophone response, as indicated in FIG. 6.)

Once the matching filter $F_2$ has been obtained, two sets of seismic data may then be combined. For example, if the data are acquired in a marine seismic survey and accelerometer data represent the vertical component of particle motion, the accelerometer data and hydrophone data may be matched by integrating the accelerometer data and applying the matching filter as described above. The matched, integrated accelerometer data and the hydrophone data may then be combined according to equation (1) to remove down-going ghost reflections.

Once the two data sets have been combined, the combined data may be subjected to further processing steps. For example, in the example given in the preceding paragraph the de-ghosted data obtained by combining the accelerometer data and hydrophone data may be subjected to any conventional processing steps to obtain information about the geological structure of the earth's interior.

In a second embodiment of the matching process of the invention one set of seismic data again contains particle motion data obtained using an accelerometer, and the other set of seismic data contains pressure data obtained using a hydrophone. In the second embodiment of the invention the hydrophone data are differentiated. The differentiation may again be carried out in the time domain or in the frequency domain, and it may be carried out using any suitable numerical technique. The matching filter $F_1$ is then applied to the differentiated set of pressure data, so as to match the differentiated set of pressure data to the set of accelerometer data.

The matched data sets may then be combined, as described above, and the combined data may be subjected to further data processing steps.

Figure 8:
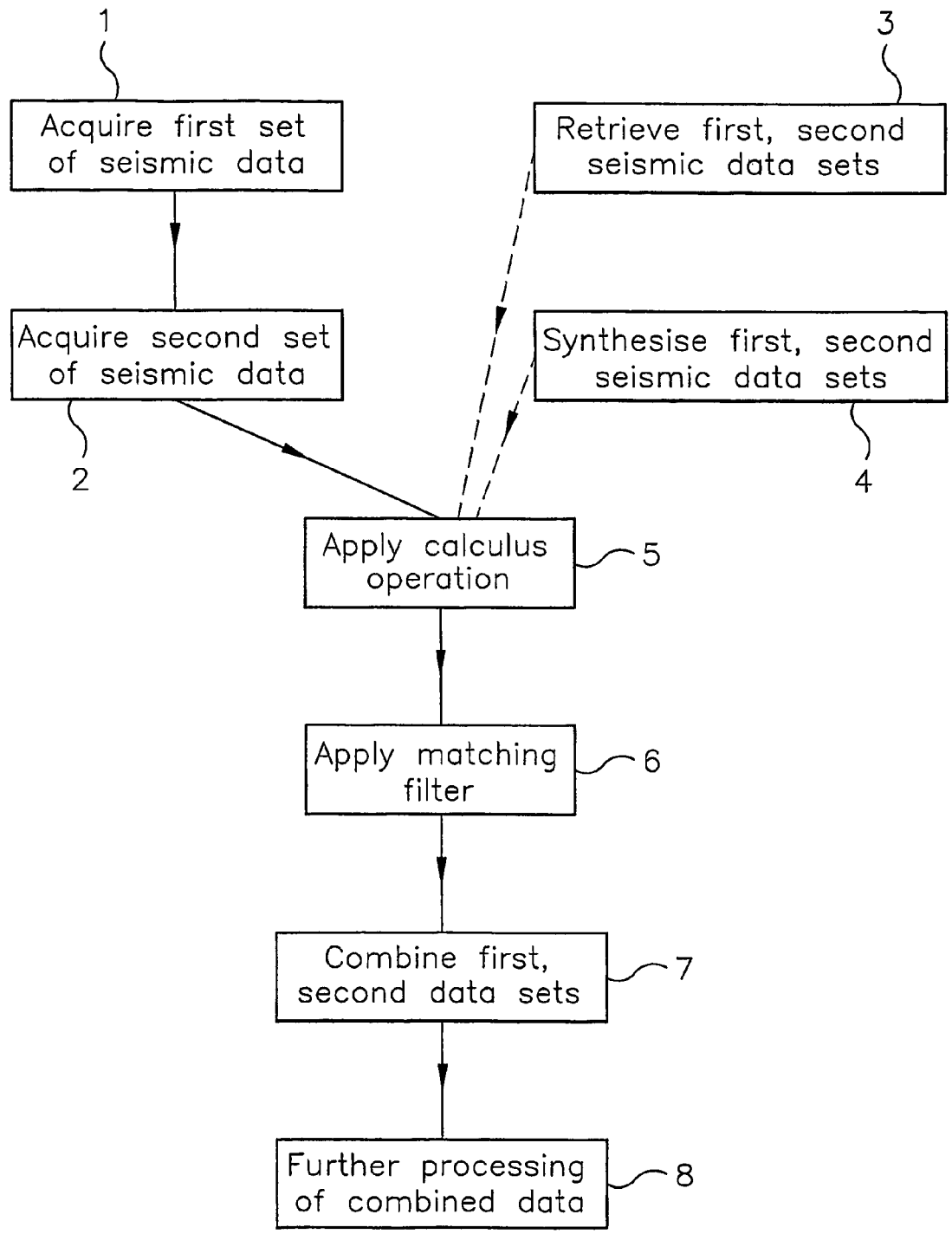
FIG. 8 is a flow diagram of one method for processing seismic data according to a method of the present invention.

FIG. 8 is a flow diagram of processing seismic data according to one embodiment of the present invention.

Initially a set of seismic data is acquired at step 1, and another set of seismic data is acquired at step 2. These sets of seismic data are acquired at the same survey location, but the one set of data is acquired using a hydrophone and the other set of data is acquired using an accelerometer. Although steps 1 and 2 are shown as occurring consecutively in FIG. 7 this is only for ease of description. In practice steps 1 and 2 may be carried out simultaneously, for example using a seismic receiver that contains two or more different types of seismic sensor.

Alternatively, the invention may be applied to pre-existing seismic data. In this case steps 1 and 2 are replaced by the step, step 3, of retrieving two sets of seismic data from storage. The two retrieved sets of seismic data were again acquired at the same survey location, but using a hydrophone and an accelerometer respectively, and represent different seismic quantities.

As a further alternative, the method may be applied to sets of synthetic seismic data. Steps 1 and 2, and step 3 may therefore be replaced by the step, step 4, of synthesizing the two sets of seismic data or retrieving preexisting sets of synthetic seismic data from storage.

Next, at step 5, a calculus operation is applied to one of the data sets. For a particular data set, the calculus operation to be applied at step 5 is the same as the calculus operation applied to the response of the sensor used to acquire that data in the determination of a matching filter according to FIG. 7(*a*) or 7(*b*). That is, step 5 may consist of applying a differential operator to the set of hydrophone data or it may consist of applying an integration operator to the set of accelerometer data. Step 5 may be carried out using any suitable numerical integration or differentiation technique. The calculus operation may be performed in the time domain or in the frequency domain. (It is preferable, although not essential, that the calculus operation on the data is carried out in the same domain as the calculus operation used to obtain the filter, since unwanted artefacts may otherwise occur.)

At step 6 the appropriate matching filter of the invention is applied to the data set to which the calculus operation was applied at step 5. If step 5 consists of applying a differential operator to the set of hydrophone data, then step 6 consists of applying the filter $F_1$, obtained according to the method of FIG. 7(*a*), to the differentiated hydrophone data. Conversely, if step 5 consists of applying an integration operator to the set of accelerometer data, then step 6 consists of applying the filter $F_2$, obtained according to the method of FIG. 7(*b*), to the integrated accelerometer data.

The two sets of data may then be combined at step 7, and the combined data may be subjected to further processing steps (denoted schematically as step 8).

In the embodiments described above a calculus operation is performed on the response of one of the sensors, and the result of this operation is used to derive the matching filter. This filter is then applied to data acquired by that sensor (i.e., the sensor to whose response the calculus operation was applied.) However, the invention is not limited to this.

Figure 7:
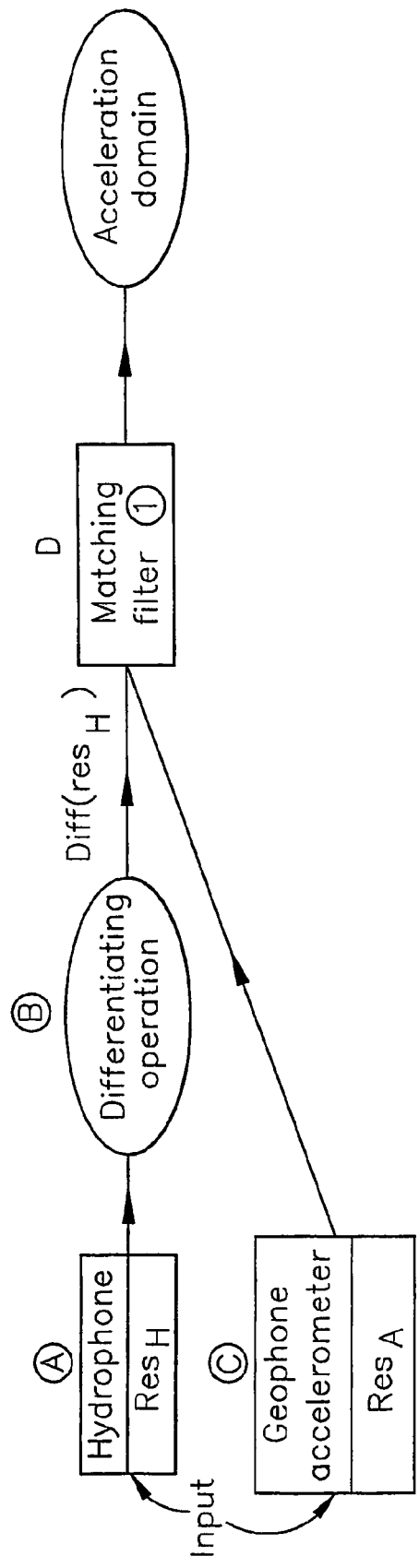
FIG. 7(a) is a flow diagram of one method for obtaining a matching filter according to the present invention.
FIG. 7(b) is a flow diagram of another method for obtaining a matching filter according to the present invention.
Figure 7:
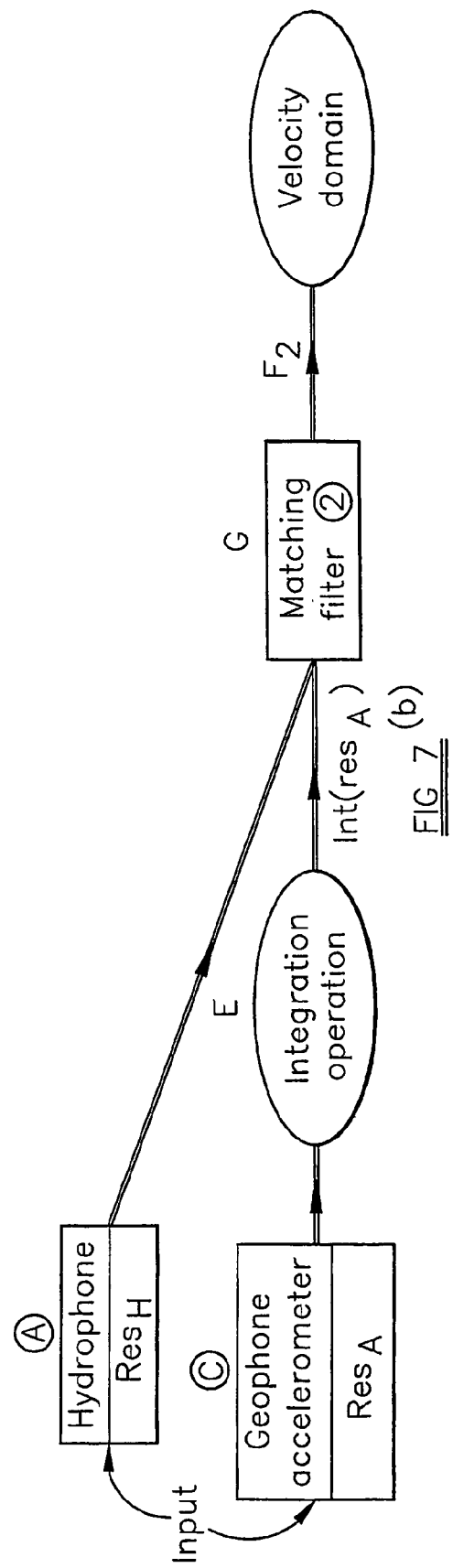

For example, if a filter is derived from the integrated accelerometer response, as in FIG. 7(*b*), the matching process does not necessarily involve applying that filter to integrated accelerometer data. The matching could be effected by, for example, using the filter obtained from the integrated accelerometer response to derive a second filter which can be applied to the hydrophone data so as to match it to the integrated accelerometer data. The second filter would be, in a general sense, an inverse of the filter derived from the integrated accelerometer response. A similar procedure may also be used where the filter is initially derived from the differentiated hydrophone response.

In principle, it would even be possible to derive two filters from the filter derived from the integrated accelerometer response or from the differentiated hydrophone response. In this case the matching process would comprise applying one filter to the integrated accelerometer data and applying the other filter to the hydrophone data. It should be noted, however, that this is likely to be more computationally intensive than a matching process that uses only a single filter.

Furthermore, the embodiments described above involve only a single calculus operation. This is applied to the response of either the accelerometer or the hydrophone, and the effect of applying the calculus operation is to put both responses into a common domain and thereby enable efficient matching. Once this has been done however, it would be possible to apply a further calculus operation to both responses, to transfer them both to a desired, different domain. In a modification of the embodiment of FIG. 7(a), for example, a further calculus operation (not shown) could be applied both to the differentiated hydrophone response and to the accelerometer response to transfer them both to another domain. In this modified embodiment, the further calculus operator applied to the hydrophone response may be combined with the differentiating operator B so that the hydrophone response is operated on by only a single calculus operator or, alternatively, the further calculus operation may be applied as a separate operation after, or possibly before, the differentiating operator B is applied. The embodiment of FIG. 7(b) may be modified in an analogous way.

Figure 9:
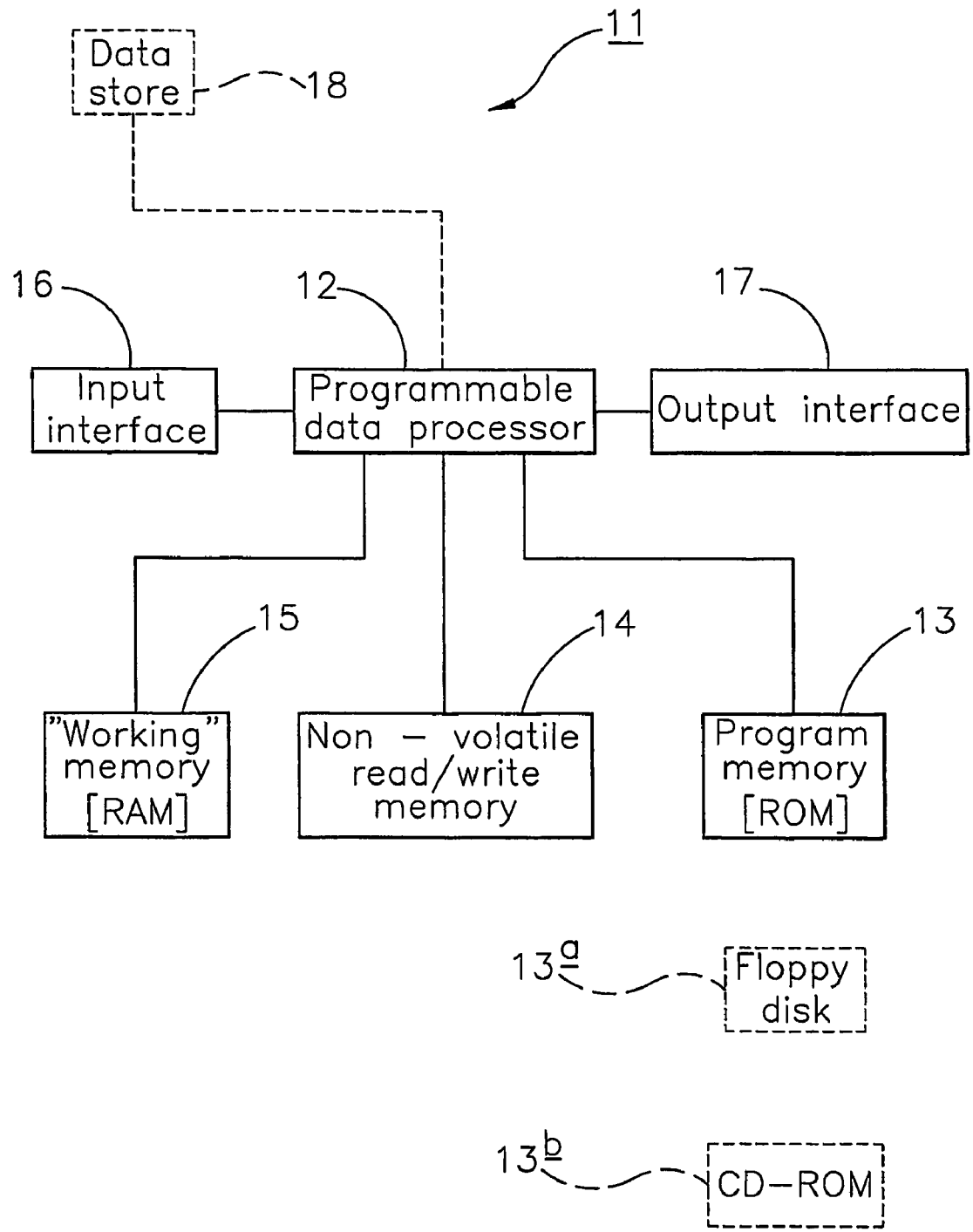
FIG. 9 is a block circuit diagram of an apparatus according to the present invention.

FIG. 9 is a schematic block diagram of an apparatus 11 that is able to perform a method according to the present invention.

The apparatus 11 comprises a programmable data processor 12 with a program memory 13, for instance in the form of a read only memory (ROM), storing a program for controlling the data processor 12 to process seismic data by a method of the invention. The apparatus further comprises non-volatile read/write memory 14 for storing, for example, any data which must be retained in the absence of a power supply. A "working" or "scratch pad" memory for the data processor is provided by a random access memory RAM 15. An input device 16 is provided, for instance for receiving user commands and data. One or more output devices 17 are provided, for instance, for displaying information relating to the progress and result of the processing. The output device(s) may be, for example, a printer, a visual display unit, or an output memory.

Sets of seismic data for processing may be supplied via the input device 16 or may optionally be provided by a machine-readable data store 18.

The results of the processing may be output via the output device 17 or may be stored.

The program for operating the system and for performing the method described hereinbefore is stored in the program memory 13, which may be embodied as a semiconductor memory, for instance of the well known ROM type. However, the program may well be stored in any other suitable storage medium, such as a magnetic data carrier 13a (such as a "floppy disk") or a CD-ROM 13b.

The invention claimed is:

1. A method of matching the response of a hydrophone and the response of an accelerometer, the method comprising the steps of:
    performing a calculus operation upon the response of at least one of the hydrophone and the accelerometer; and
    deriving a filter from the output of the calculus operation and the response of the other of the hydrophone and the accelerometer by dividing a result of the calculus operation by the response of the other of the hydrophone and the accelerometer.

2. A method as claimed in claim 1 wherein the step of performing the calculus operation comprises the step of integrating the response of the accelerometer with respect to time.

3. A method as claimed in claim 1 wherein the step of performing the calculus operation comprises the step of differentiating the response of the hydrophone with respect to time.

4. A method as claimed in claim 1 further comprising:
    obtaining first seismic data using the one of the hydrophone and the accelerometer and obtaining second seismic data using the other of the hydrophone and the accelerometer; and
    using the filter to match the first seismic data and the second seismic data.

5. A method as claimed in claim 1 further comprising:
    synthesizing first seismic data for the one of the hydrophone and the accelerometer and synthesizing second seismic data for the other of the hydrophone and the accelerometer; and
    using the filter to match the first seismic data to the second seismic data.

6. A method as claimed in claim 4 or 5 and further comprising:
    applying the calculus operation to the first seismic data; and
    wherein the step of using the filter to match the first seismic data to the second seismic data comprises applying the filter to the first seismic data after the calculus operation has been applied to the first seismic data.

7. A method as claimed in claim 4 and further comprising: combining the matched first seismic data and the second seismic data.

8. A method as claimed in claim 7 and comprising the further step of applying one or more data processing steps to the combined seismic data.

9. An apparatus for matching the response of a hydrophone and the response of an accelerometer, the apparatus comprising:
    means for performing a calculus operation upon the response of at least one of the hydrophone and the accelerometer; and
    means for deriving a filter from the output of the calculus operation and the response of the other of the hydrophone and the accelerometer by dividing a result of the calculus operation by the response of the other of the hydrophone and the accelerometer.

10. An apparatus as claimed in claim 9 and further comprising:
    means for receiving first seismic data acquired using the one of a hydrophone and an accelerometer and second seismic data acquired using the other of the hydrophone and the accelerometer; and
    means for matching the first seismic data and the second seismic data using the filter.

11. An apparatus as claimed in claim 10 and further comprising: means for applying the calculus operation to the first seismic data; and means for subsequently applying the filter to the first seismic data.

12. An apparatus as claimed in claim 10 and further comprising means for combining the first seismic data and the second seismic data.

13. An apparatus as claimed in claim 10 comprising a programmable data processor.

14. A storage medium containing a program configured to:
    perform a calculus operation upon the response of at least one of a hydrophone and an accelerometer; and
    derive a filter from the output of the calculus operation and the response of the other of the hydrophone and the accelerometer by dividing a result of the calculus operation by the response of the other of the hydrophone and the accelerometer.

15. The storage medium of claim 14, wherein the program configured to perform the calculus operation is further configured to integrate the response of the accelerometer with respect to time.

16. The storage medium of claim 14 wherein the program configured to perform the calculus operation is further configured to differentiate the response of the hydrophone with respect to time.

17. The storage medium of claim 14, wherein the program is further configured to:
  obtain first seismic data using the one of the hydrophone and the accelerometer:
  obtain second seismic data using the other of the hydrophone and the accelerometer; and
  use the filter to match the first seismic data and the second seismic data.

18. The storage medium of claim 14, wherein the program is further configured to:
  synthesize first seismic data for the one of the hydrophone and the accelerometer;
  synthesize second seismic data for the other of the hydrophone and the accelerometer; and
  use the filter to match the first seismic data to the second seismic data.

19. The storage medium of claim 17, wherein the program is further configured to:
  apply the calculus operation to the first seismic data; and
  wherein the program configured to use the filter to match the first seismic data to the second seismic data is further configured to apply the filter to the first seismic data after the calculus operation has been applied to the first seismic data.

* * * * *